United States Patent [19]

Shea et al.

[11] 3,727,484
[45] Apr. 17, 1973

[54] SPEED CHANGING TRANSMISSION
[75] Inventors: Dennis W. Shea, Toledo, Ohio; William C. Stoneman, Temperance, Mich.
[73] Assignee: Dana Corporation, Toledo, Ohio
[22] Filed: May 3, 1971
[21] Appl. No.: 139,486

[52] U.S. Cl. ..................74/768, 74/750 B, 192/6 A
[51] Int. Cl. ...........................F16h 57/10, F16h 3/44
[58] Field of Search .........................74/768, 750 B; 192/6 A; 280/236–238

[56] References Cited
UNITED STATES PATENTS

| 763,654 | 6/1904 | Baker | 74/768 |
|---|---|---|---|
| 2,553,465 | 5/1951 | Monge | 74/768 X |
| 2,717,524 | 9/1955 | Davis | 74/768 X |
| 2,900,848 | 8/1959 | Henn-Collins | 74/768 |
| 2,925,134 | 2/1960 | Cunningham, Jr. | 74/768 X |
| 3,417,639 | 12/1968 | Johnson et al. | 74/768 X |

*Primary Examiner*—Arthur T. McKeon
*Attorney*—Harold D. Shall, Walter E. Pavlick and John F. Teigland

[57] ABSTRACT

A 3-speed transmission of the planetary type having three sets of planet gears, three sun gears and three ring gears. All planet gears are mounted on and driven by one common carrier which is connected to the input shaft. The sun gears are carried by an output shaft which is rotatably mounted on the input shaft and which extends from the transmission housing to carry a driving sprocket. A shifting mechanism, including a plurality of spring loaded pawls engageable with the ring gears and operable by a slotted shifting shaft, is selectable to maintain a desired one of the ring gears stationary relative to the housing to provide the desired speed ratio between the input and output shafts. The transmission is shown adapted for use as a bicycle drive and mounted such that the transmission housing is fixed against rotation relative to the bicycle frame; the pedal crank being the input shaft to the transmission and extending completely through the same and being rotatably mounted in the bicycle housing with the sun gear driven output shaft rotatably mounted on the input shaft.

16 Claims, 8 Drawing Figures

PATENTED APR 17 1973 3,727,484

INVENTORS
DENNIS W. SHEA
WILLIAM C. STONEMAN
BY
Harold D. Shall
ATTORNEY

INVENTORS
DENNIS W. SHEA
WILLIAM C. STONEMAN

BY *Harold D. Hall*

ATTORNEY 3,727,484

SPEED CHANGING TRANSMISSION

SUMMARY OF THE INVENTION

This invention relates to planetary transmissions generally and more particularly to such a transmission which can be manufactured inexpensively, is extremely compact and provides extreme ease of shifting. The transmission is suitable for use in a large number of common and special installations and environments; an ideal application being in two-wheel vehicles such as a bicycle having a conventional coaster-brake type driving wheel.

Bicycles having a plural ratio drive arrangement have become widely accepted and used throughout the world. The most common of these includes a multi-speed drive arrangement in the hub of the driving wheel or between the pedal sprocket and the driving wheel sprocket; however, with such a driving engagement, separate hand operated caliper brakes, which engage the bicycle wheel adjacent the periphery thereof, are utilized since the space within the wheel hub being operated by the multi-speed drive arrangement, does not also accomodate a braking means of sufficient size to be satisfactorily operable.

The transmission of the present invention is located adjacent to the frame supported pedal crank hub (hereinafter referred to as frame hub) and, therefore, can be utilized to drive the sprocket carried by the driving wheel; the latter being provided with a conventional coaster brake wheel hub.

In the coaster brake wheel hub, rotating the wheel sprocket in the drive direction imparts a forward drive rotation to the wheel. When the sprocket is held stationary, i.e., when the pedals are not actuated, the driving wheel can overrun the wheel sprocket, and when the sprocket is rotated in the reverse direction, braking means associated with the driving wheel hub are energized to brake the wheel rotation and thereby stop movement of the bicycle. The transmission of this invention, when used with the coaster-brake equipped driving wheel provides a plural ratio drive and also allows for pedal actuated braking. Since the coaster-brake hub provides for driving wheel overrunning there is no necessity for a "neutral" condition in the driving transmission of this invention; however, a neutral condition can easily be provided as hereinafter explained in the event such is desired.

It is, therefore, an object of this invention to provide a planetary multiple ratio transmission which is compact, easy to shift and inexpensive to manufacture.

Another object of this invention is to provide a multi-speed ratio transmission which can be used to drive a bicycle and can be utilized with a driving wheel having a coaster-brake hub so that multiple ratios and pedal braking can be obtained.

Further and other objects of this invention will become apparent from the following detailed description taken in conjunction with the accompanying drawings wherein.

Figure 5:
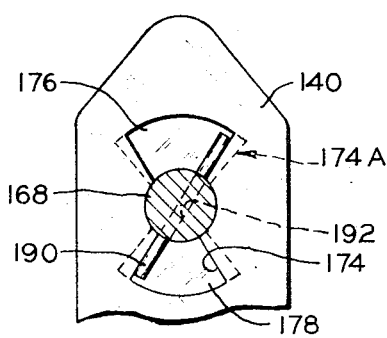
Figure 2:
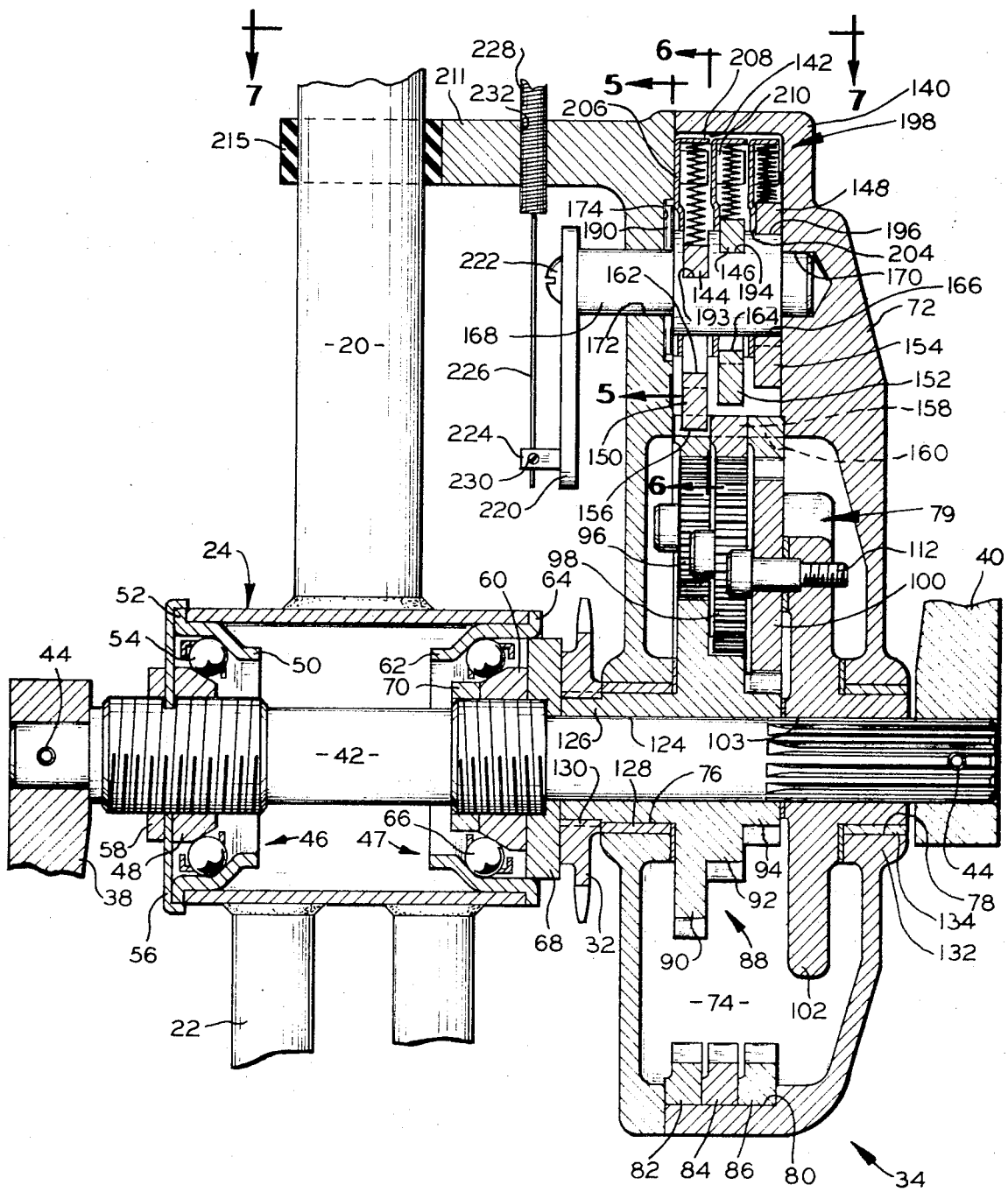
FIG. 2 is a sectional view of the transmission of this invention taken along the lines 2—2 in FIG. 1, with two of the planet gear sets shown out of their normal position for clarity purposes.
Figure 6:
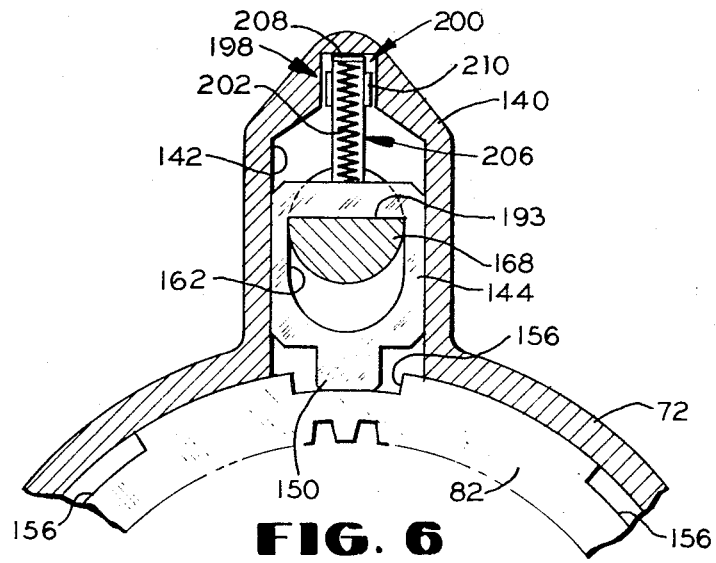
Figure 7:
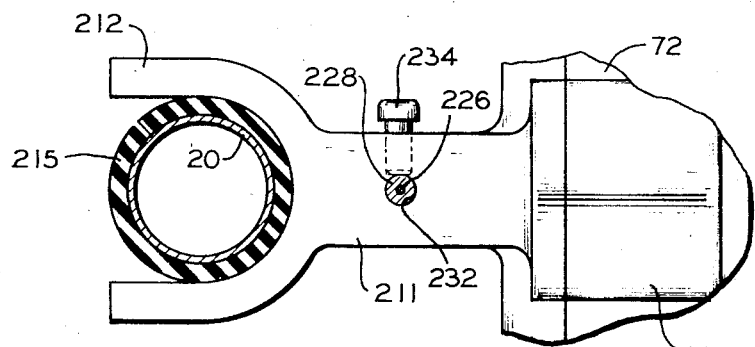
Figure 8:
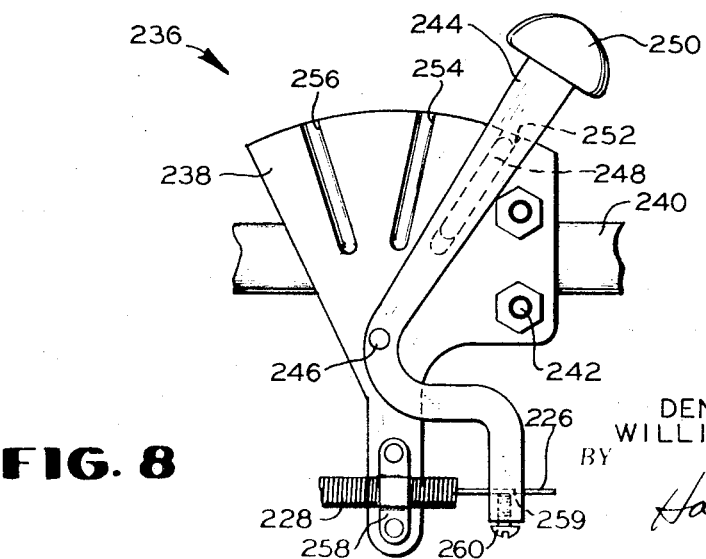

FIGS. 5 and 6 are sectional views of the transmission when seen along the lines 5—5 and 6—6 in FIG. 2, respectively;

FIG. 7 is a fragmentary sectional view of the transmission and bicycle frame taken along the lines 7—7 in FIG. 2; and FIG. 8 is a schematic view of the hand operable shift lever for shifting the transmission of this invention among its various ratios.

Figure 1:
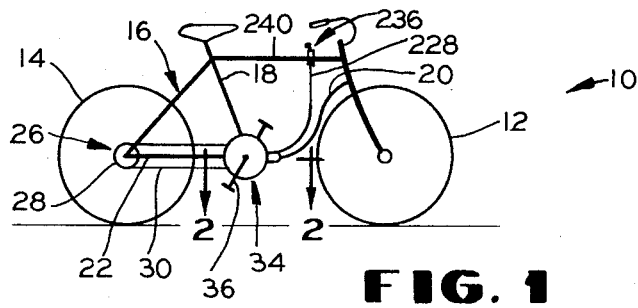
FIG. 1 is a schematic side elevational view of the bicycle incorporating a transmission of this invention.

Referring now to the drawings and more particularly to FIG. 1, a bicycle shown schematically at 10 has a forward wheel 12 and a rear driving wheel 14, mounted on a frame 16. The frame 16 includes a vertically extending seat post element 18, a forwardly extending lower frame element 20 and a pair of rearwardly extending lower frame elements 22 which elements 20 and 22 join to a cylindrical frame hub 24 (the hub being seen in FIG. 2).

The driving wheel 14 has a conventional coaster-brake wheel hub 26 which includes an input sprocket 28 for the driving wheel which is drivingly connected by a chain 30 to a drive sprocket 32 (the sprocket 32 being shown in FIG. 2 and more fully explained hereinafter).

A transmission 34 provides a driving connection between a pedal crank assembly 36 and the sprocket 32. More particularly, the pedal crank assembly 36 includes a left and right pedal crank, 38 and 40 respectively, disposed in a conventional opposed relationship and drivingly secured to the outboard ends of a through or input shaft 42 as by roll pins 44 passing through aligned openings therein. The left half of the shaft 42 is mounted for rotation in the frame hub 24 by a pair of bearings 46 and 47. The bearing 46 has an inner race 48 threaded on the shaft 42, an outer race 50, the inboard end of which is lightly pressed into the bore of a hub 24 with an integral flange 52 of the outer race engaging the left outer end of the hub 24, and a plurality of caged ball bearings 54 disposed between the races. A washer 56 in the form of a dust cap is disposed on the shaft 42 with the right side thereof abutting the inner race 48 and the flanged periphery thereof slightly spaced from and overlapping the end of the hub 24, and a lock nut 58 is threaded on the shaft 42 and abuts the washer 56, thereby to press the latter against the inner race 48. The bearing 47 has an inner race 60 threaded on the shaft 42, an outer race 62, the inboard end of which is lightly pressed into the bore 24, with an integral flange 64 on the outer race engaging the right outer end of the hub 24, and a plurality of caged ball bearings 66 between the races. A thrust washer 68 abuts the right side of the inner race 60 and also abuts the left side of the sprocket 32, while a lock nut 70 is threaded on the shaft 42 and abuts the left side of the inner race 60.

To remove the shaft 42 from the hub 24, it is only necessary to remove the pedal crank 38, the lock nut 58 and the washer 56; the inner race 48 can then be removed from the shaft 42 and then the shaft 42 carrying the inner race 60 can be withdrawn to the right from the hub 24. Thus, if the pedal crank assembly of a standard single speed bicycle is removed, the transmission 34 of this invention can easily replace the same to convert the standard bicycle to a multi-speed bicycle; however, it should be understood that the housing 24 can replace the hub of a standard bicycle, with the frame elements 20, 22 and 18 being attached to the housing 72 of the transmission 34, and suitable bearings installed in the housing 72 to take the place of the bearings 46 and 47.

The transmission 34 includes a 2-piece housing 72 having an annular cavity 74 and a pair of aligned bores 76 and 78 therein; the rightward half of shaft 42 extending through the bores and being rotatable relative thereto. Disposed in the cavity 74 is a planetary gear shown generally at 79. More particularly, in the peripheral wall of the cavity 74 is an annular slot 80, and three ring gears 82, 84 and 86 have the peripheral portion thereof rotatably received in the slot 80. The gear set 79 also includes a cluster gear 88 comprised of three sun gears 90, 92 and 94 cooperatively disposed with the ring gears 82, 84 and 86 respectively. Drivingly disposed between and meshed with the ring gear 82 and sun gear 90 are a pair of planetary gears 96 (as seen in FIGS. 2 and 3) while between the ring gear 84 and the sun gear 92 are a pair of planet gears 98 and between the ring gear 86 and the sun gear 94 are a pair of planet gears 100.

Figure 3:
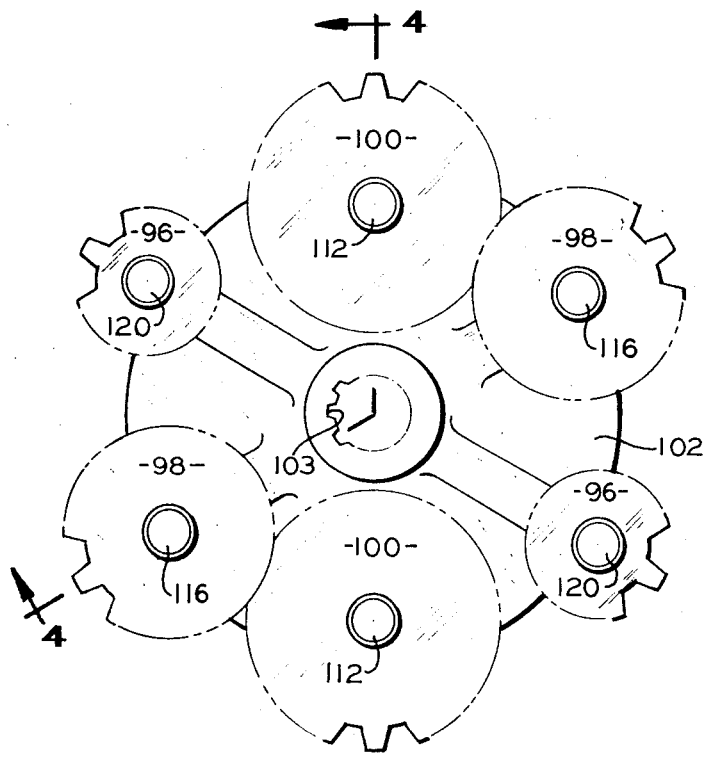
FIG. 3 is an elevational view of the planet gears and planet carrier subassembly when seen as through viewed from the left in FIG. 2.

The planet gears are shown in FIG. 2 out of their normal position for illustration purposes, but reference to FIG. 3 reveals that the planet gears 96 are diametrically opposed from each other as are the pair of gears 98 and the pair of gears 100, with each planet gear 96 disposed circumferentially intermediate a planet gear 98 and 100, each planet gear 98 being intermediate a planet gear 96 and 100 and each planet gear 100 being intermediate a planet gear 96 and 98.

Figure 4:
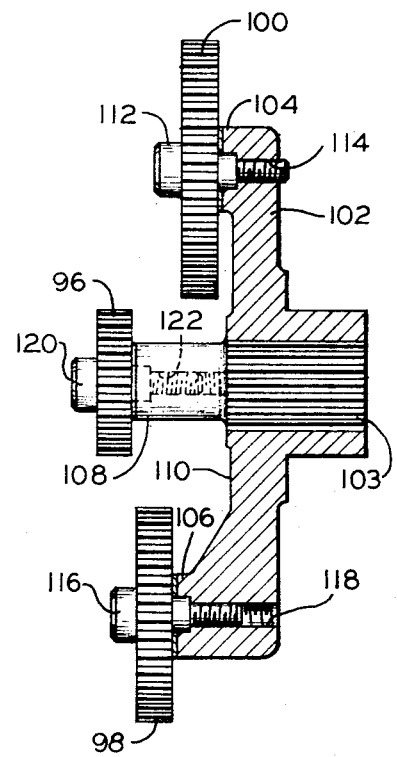
FIG. 4 is a sectional view of the planet gears and planet carrier subassembly taken along the lines 4—4 in FIG. 3.

Referring now to FIGS. 3 and 4, the planet gears 96, 98 and 100 are rotatably mounted on a planet carrier 102. The carrier 102 is generally disk shaped with a splined central bore 103 and has three pairs of diametrically opposed bosses 104, 106 and 108. The bosses 104 project slightly to the left of the left face 110 of the carrier 102 and each rotatably mounts one of the pair of planet gears 100 by means of a shouldered bolt 112 passing through a central bore in the gear and threaded into a bore 114 in the bosses 104. The bosses 106 project further to the left than the bosses 104 and each rotatably mounts one of the pair of planet gears 98 by means of a shouldered bolt 116 passing through a central bore in the gear and threaded into a bore 118 in the bosses 106; the bosses 106 projecting to the left sufficiently to align the planet gears 98 with the ring gear 84 as seen in FIG. 2. The bosses 108 project further to the left than the bosses 106 and each rotatably mounts one of the pair of planetary gears 96 by means of a shouldered bolt 120 passing through a central bore in the gear and threaded into a bore 122 in the bosses 108; the bosses 108 projecting to the left sufficiently to align the planet gears 96 with the ring gear 82.

The cluster gear 88 has a bore 124 therein and is rotatably mounted on the shaft 42; a hub 126 of the gear 88 extending to the left from the sun gear 90 and being rotatably mounted in the bore 76 of the housing 72 by a bushing 128. The portion of the hub 126 outwardly of the housing 72 serves as the output from the transmission 34 and has the sprocket 32 mounted thereon for unitary rotation, as by the splined connection shown at 130. The planet carrier 102 is positioned immediately to the right of the cluster gear 88 and is splined for unitary rotation on the shaft 42, with the carrier having a rightwardly extending hub 132 rotatably mounted in the housing bore 78 by a bushing 134.

A particular combination of gear teeth in the various gear ratios and the increased speed ratio obtained thereby is set forth below; such ratio being obtained by maintaining the desired ring gear 82, 84 or 86 stationary relative to the housing 72 while allowing the other ring gears to rotate freely. Ring gear 82 provides the low or first gear ratio, ring gear 84 providing the intermediate or second gear ratio and ring gear 86 providing the high or third gear ratio. It is noted that all the ring gears are identical in size and tooth number, the different ratios being obtained by varying the size and number of teeth of the sun and planet gears.

| Ring gear | | Planet gear | | Sun gear | | Increased speed ratio |
|---|---|---|---|---|---|---|
| Gear number | Number of teeth | Gear number | Number of teeth | Gear number | Number of teeth | |
| 82 | 62 | 96 | 13 | 90 | 36 | 2.72 (1st) |
| 84 | 62 | 98 | 19 | 92 | 24 | 3.58 (2nd) |
| 86 | 62 | 100 | 23 | 94 | 16 | 4.87 (3rd) |

The sprocket 32 utilized with the above gear ratios in several transmissions tested in installations or conventional bicycles had 13 teeth, while the hub sprocket 28 ranged from 18 to 20 teeth, with an average of 19 teeth so that the average speed decrease obtained through the sprockets was 0.68. Thus, with the ring gear 84 selected, the overall ratio increase obtained with the above drive arrangement through the transmission 34 and sprockets 32 and 28, was 2.43, which compares to the "normal" overall drive increase ratio of 2.4 provided by the sprockets of the average single speed bicycle, so that the ring gear 82 provides an underdrive ratio and ring gear 86 provides an overdrive ratio when compared to the "normal" ratio. It should be understood that ratios other than those described above may be provided by varying the number of teeth in the gears and/or sprockets depending on the results desired.

A shiftable means is provided for selecting the desired ring gear and preventing the same from rotating relative to the housing 72. More particularly, and with reference to FIGS. 2 and 6, the housing 72 has a projecting portion 140 having a radially extending generally rectangular bore 142 therein which opens into the slot 80 and receives three pawls 144, 146 and 148; the pawls being movable radially within the bore 142 and being aligned respectively with the ring gears 82, 84 and 86. All the pawls are of identical shape and have an axial width slightly less than the width of the ring gears. As clearly seen in FIG. 6 with reference to pawl 144, when viewed from the axially facing side thereof, the pawls are generally rectangular in shape and in a close sliding fit in the bore 142. The radially inner end of the pawl 144 has a lug 150 formed thereon, while the pawls 146 and 148, respectively, have lugs 152 and 154 formed thereon. When the pawl 144 is in its radially innermost position, the lug 150 thereon can engage one of a plurality of notches 156 formed in the periphery of the ring gear 82; a similar relationship existing with respect to the lugs 152 and 154 and the notches 158 and 160 in the ring gears 84 and 86, respectively. When the pawls 144, 146 and 148 are radially outwardly, the lugs thereon are spaced radially outwardly from the periphery of the ring gears.

The pawls 144, 146 and 148, respectively, have an opening 162, 164 and 166 extending axially therethrough which openings are elongated in the radial direction and are rounded at the radially inner end thereof. An axially extending shifter shaft 168, disposed parallel to the shaft 42, extends through the pawl openings 162, 164 and 166. The right end of the shaft 168 is rotatably received in a blind bore 170 formed in the housing 72; the bore having a shoulder adjacent the tapered inner end thereof, against which shoulder the shaft 168 bottoms to inhibit rightward movement thereof. The left end of the shaft 168 is rotatably mounted and extends through a bore 172 formed in the left wall of the housing 72. The housing 72 is formed with a counterbore 174 in the inner wall thereof surrounding the bore 172. The counterbore 174, as seen in FIG. 5, is made from opposed pie-shaped portions, shown in full line at 176 and 178. A roll pin 190 is pressed in a radially extending opening 192 in the shaft 168 and abuts the axial end wall of the counterbore 174 to limit leftward movement of the shaft 168 and also, when it engages the circumferential limits of the pie-shape counterbore, it limits rotational movement of the shaft 168.

The shaft 168 is provided with three axially spaced and chordally extending slots therein, 193, 194 and 196, one at the location of each of the pawls 144, 146 and 148, respectively. The slots are disposed angularly with respect to each other, for example, in this preferred embodiment with the parts of the relative size shown, and as viewed from the left in FIG. 2, a workable relationship is to have the slot 194 advanced approximately 32 degrees counterclockwise from the slot 193, and the slot 196 advanced approximately 32° counterclockwise from the slot 194. When the slot 193 is horizontal, the roll pin 190 engages the side wall of the pie-shaped portion as shown in FIG. 5. When the slot 194 is disposed horizontally the roll pin 190 is disposed intermediate the side walls of the counterbore 174, and when the bottom of the slot 196 is disposed horizontally, the roll pin engages the opposite side walls of the counterbore 174 from that shown in engagement in FIG. 5. Accordingly, the side walls of the pie-shaped counterbore conveniently are at an included angle of 64 degrees with respect to each other and thereby limit angular movement of the shaft 168 beyond that described.

A spring assembly 198 is provided for each of the pawls 144, 146 and 148, which includes a spring retainer 200 and a compression coil spring 202. The retainers 200 have a body portion 204 which is rectangular when viewed from the axial side thereof and closely fits in the bore 142 and have an axially extending opening therein which rotatably receives and closely fits the shaft 168, one retainer being to the left of each pawl so that a retainer spaces pawls 144 and 146 and spaces pawls 146 and 148; the location of the retainer with respect to the shaft is adjacent to the slots 194, 196 and 198.

The retainers 200 have a spring guide portion 206 extending radially outwardly from the body portion 204, the radially outer end thereof being bent to form an axially extending reaction flange 208 which overlies the pawl immediately to the right of the body portion 204 of the particular spring retainer, while the sides thereof are also bent, in the same axial direction as the flange 208, to form lateral spring-guides 210. One of the coil springs 202 is compressed between the radially outer end of each of the pawls 144, 146 and 148 and the reaction flange 208 overlying the same, thereby to constantly urge the pawls radially inwardly. When the slot 193 is disposed with its bottom horizontally the pawl 144 will be urged by its associated spring 202 to move radially inwardly into engagement with the periphery of the associated ring gear 82. When the shaft 168 is rotated to move the slot 194 to a horizontal position, the pawl 144 will be cammed radially outwardly and the pawl 146 will be moved radially inwardly by its associated spring until it engages the periphery of the associated ring gear 84 and when the slot 196 is disposed with its bottom horizontally the pawl 146 will be cammed radially outwardly and the pawl 148 will be urged by its associated spring to move radially inwardly until it engages the periphery of the associated ring gear 86. When the slot 156, 158 or 160 in the ring gear 82, 84 or 86, respectively, becomes aligned with the lug 150, 152 or 154, respectively, which has been moved inwardly, the particular lug will be moved into the aligned slot and lock the ring gear against rotational movement relative to the housing 72. When one of the pawls 144, 146 or 148 has been moved radially inwardly into its respective slot 193, 194 or 196, the other two pawls will be held outwardly by the engagement of the cylindrical surface of the shaft 168 which is angularly displaced from the slot associated with that pawl at such time.

When the pawls are displaced radially outwardly by the cylindrical portions of the shaft 168 the entire reactive load of the springs 202 are imposed upon the shaft 168, since the outer wall of the opening in the pawls is being pressed against the shaft as is the inner wall of the opening of the retainers 200, so that none of this load is being imposed upon the housing 34 nor is the shaft being biased relative to the housing by these springs.

While no neutral condition has been provided in the transmission 34, such can easily be accomplished if desired. For example, the slots 193, 194 and 196 can be circumferentially displaced at wider angles than shown in the drawings, concurrently with increasing the angular extent of the counterbore 174, as shown in the dotted line position at 174A, to provide a neutral condition between gear shift positions. Additionally, neutral conditions can be provided below first gear and above third gear by not changing the indexing of the slots 193, 194 and 196, but merely increasing the angular extent of the counterbore 174 to that shown at 174A.

Means are provided to prevent rotation of the housing 72. More particularly, extending laterally to the left from the left side of the projecting portion 140 toward the frame 16 is a boss 211 terminating in a bifurcated portion 212. The bifurcated portion is adapted to receive a suitable frame element, the particular one being received in the drawings is the forwardly extending lower frame element 20; however, the housing 72 can be indexed to place the boss 211 in other positions, such as with the bifurcation receiving the seat post element 18 or the rearwardly extending lower frame element 22, if desired. If the frame elements are directly joined to the housing the boss 211 is not necessary. A split elastomeric ring 215 is slipped onto the frame element 20 at its engagement by the bifurcated portion 212 to cushion shock engagement therebetween.

Shifting means is provided for rotating the shaft 168 and thereby shifting the transmission 34. The shaft 168 has a lever 220 suitably secured to the outboard end thereof as by a screw 222, which lever extends radially therefrom. The lever 220 has a projection 224 extending at a right angle adjacent its remote end, and the end of a control wire 226 of a cable control 228 passes through an opening in the projection 224 and is secured therein by a set screw 230. The cable control passes through an opening 232 in the boss 211 and is secured therein by a set screw 234, and then extends to a manually operable shifting mechanism shown generally at 236 in FIGS. 1 and 8.

The shifting mechanism 236 includes a bracket 238 suitably secured to the bicycle frame 16, for example, to an upper horizontal frame element 240, as by a U-bolt 242. A dog-leg lever 244 is pivotally secured to the bracket intermediate its ends by a rivet 246 and has a detent 248 formed therein at a location intermediate the rivet and a handle 250 formed on the upper end thereof; which detent cooperates with three spaced indentations 252, 254 and 256 formed in the bracket 238. The upper end of the protective cover of the cable control 228 is secured to the bottom of the bracket 238 by a clamp 258 and the control wire 226 thereof extends into an opening 259 formed in the lower end of the lever 244 and is secured therein by a set screw 260. The position of lever 244 shown in FIG. 8, with the detent 248 engaging the indentation 252, corresponds to the first speed position. When the lever is moved counterclockwise to engage the detent 248 with the indentation 254 the lever and the shaft 168 are in the second speed position, while when the lever is moved further counterclockwise, the detent 248 will engage in indentation 256 and the lever and the shaft 168 will be in the third speed position.

While a three speed transmission has been shown and described, it is readily apparent that gear sets can be removed to reduce the number of ratios and, further, gear sets can be added to increase the number of ratios, accompanied with decreased and increased, respectively, numbers of pawls cooperating with notches in the shaft 168, and suitable adaptation in this shifting mechanism 236.

Having described a preferred embodiment of this invention, what is claimed is:

1. A speed changing transmission comprising (a) a housing including means for securing same against rotation; (b) an input shaft rotatably mounted in and extending completely through said housing and adapted to be driven from either one or both ends thereof; (c) an output shaft rotatably mounted on said input shaft and in said housing and having an output end extending from said housing with one end of said input shaft extending beyond said output end; (d) a planetary gear set disposed in said housing for driving said output shaft from said input shaft and including at least a first ring gear and sun gear with a pair of first planet gears drivingly connecting same and a second ring gear and sun gear and a pair of second planet gears drivingly connecting same; (e) a planet carrier mounting both said first and second pairs of planet gears, and being drivingly connected to said input shaft for unitary rotation therewith; (f) said sun gears being rotatable about said input shaft, disposed adjacent to said planet carrier and drivingly connected to said output shaft; and (g) selectable means for maintaining a selected one of said ring gears stationary relative to said housing for selecting the desired gear ratio.

2. A transmission according to claim 1 wherein said selectable means includes a first and a second cam and spring operated pawls movable toward and away from said ring gears for engaging and disengaging said first and second ring gear, respectively.

3. A transmission according to claim 1 wherein said housing includes a substantially annular counterbore, the peripheries of said ring gears are disposed and mounted for rotation in said counterbore and piloted thereby against axial movement relative thereto, and wherein the mounting of said pair of first planet gears is at a greater radial distance than the mounting of said second pair of planet gears.

4. A transmission according to claim 3 wherein said ring gears have internal teeth, with the teeth on both said ring gears being of equal number and pitch diameter, and said first sun gear is larger than said second sun gear.

5. A transmission according to claim 4 wherein said selectable means includes a first and second cam and spring operated pawls movable toward and away from said ring gears for engaging and disengaging said first and second ring gear, respectively.

6. A transmission according to claim 5 wherein said housing has a projection thereon, with a radially extending bore intersecting said annular counterbore, said pawls are disposed in the bore of said projection and movable radially therein and enterable into said annular bore upon moving radially inwardly to engage said ring gears.

7. A transmission according to claim 6 wherein said pawls have a lug on the radial inner end thereof, and said ring gears have a plurality of spaced detents formed in the periphery thereof engageable by said lugs.

8. A speed changing transmission adapted to be mounted in conjunction with a frame mounted hub of a bicycle comprising, a housing including means for securing same against rotation, an input shaft rotatably mounted in and extending completely through said housing and adapted to be driven from either one or both ends thereof, an output shaft rotatably mounted on said input shaft and in said housing and having an output end extending from said housing, a sprocket drivingly mounted on the output end of said output shaft, one end of said input shaft extending beyond said sprocket and including means for rotatably mounting the same in the hub of a bicycle, a planetary gear set disposed in said housing for driving said output shaft from said input shaft and including at least a first ring gear and sun gear with a pair of first planet gears drivingly connecting same and a second ring gear and sun gear and a pair of second planet gears drivingly connecting same, a planet carrier mounting both said first and second pairs of planet gears, and being drivingly connected to said input shaft for unitary rotation therewith, said sun gears being rotatable about said input shaft, disposed adjacent to said planet carrier and drivingly connected to said output shaft, and selectable means for maintaining a selected one of said ring gears stationary relative to said housing for selecting the desired gear ratio.

9. A speed changing transmission comprising, a housing including means for securing same against rotation and having a bore and substantially annular counterbore, an input shaft rotatably mounted in and extending completely through said housing and adapted to be driven from either one or both ends thereof, an output shaft rotatably mounted on said input shaft and in said housing and having an output end extending from said housing with one end of said input shaft extending beyond said output end, a planetary gear set disposed in said housing bore for driving said output shaft from said input shaft and including at least a first ring gear and sun gear with a pair of first planet gears drivingly connecting same and a second ring gear and sun gear and a pair of second planet gears drivingly connecting same, the peripheries of said gears being disposed and mounted for rotation in said counterbore and piloted thereby against axial movement relative thereto, said ring gears having internal teeth with the teeth on both said ring gears being of equal number and pitch diameter, a planet carrier mounting both said first and second pairs of planet gears, and being drivingly connected to said input shaft for unitary rotation therewith, the mounting of said pair of first planet gears being at a greater radial distance than the mounting of said second pair of planet gears, said sun gears being rotatable about said input shaft, disposed adjacent to said planet carrier and drivingly connected to said output shaft, with said first sun gear being larger than said second sun gear, selectable means for maintaining a selected one of said ring gears stationary relative to said housing for selecting the desired gear ratio, said selectable means including a shifter shaft and a first and a second cam and spring operated pawls movable toward and away from said ring gears for engaging and disengaging said first and second ring gear respectively, said housing also having a projection thereon containing radially extending bore intersecting said annular counterbore, said pawls being disposed in the bore of said projection and movable radially therein and enterable into said annular bore upon moving radially inwardly to engage said ring gears, also said shifter shaft being rotatably mounted in said housing and disposed in said radially extending bore, spring means are connected to said pawls for biasing the same radially inwardly toward said ring gear, and said shifter shaft being rotatably mounted in said housing and disposed in said radially extending bore and including a first and a second detent means spaced and indexed from each other with said detent means being cooperable with said first and second pawls respectively for allowing said spring means to bias the selected one of said pawls radially inwardly to engage a selected one of said ring gears.

10. A transmission according to claim 9 wherein said spring means includes a separate spring retainer and coil spring associated with each of said pawls, said coil spring being compressed between said spring retainer on the pawl associated therewith and said spring retainer being carried by said shifter shaft and imposing the reaction load of said coil spring on said shifter shaft.

11. A transmission according to claim 10 wherein said detent means are chordal slots formed in said shifter shaft, with said slots being axially spaced and disposed angularly in a circumferential direction with respect to each other, and said retainers are carried by said shaft at a location adjacent to said slots.

12. A speed changing transmission adapted to be mounted in conjunction with a frame mounted hub of a bicycle comprising, a housing including means for securing same against rotation and having a bore and substantially annular counterbore, an input shaft rotatably mounted in and extending completely through said housing and adapted to be driven from either one or both ends thereof, an output shaft rotatably mounted on said input shaft and in said housing and having an output end extending from said housing, a sprocket drivingly mounted on the output end of said output shaft, one end of said input shaft extending beyond said sprocket and including means for rotatably mounting the same in the hub of a bicycle, the opposed ends of said input shaft including means for drivingly mounting pedal cranks thereon, a planetary gear set disposed in said housing bore for driving said output shaft from said input shaft and including at least a first ring gear and sun gear with a pair of first planet gears drivingly connecting same and a second ring gear and sun gear and a pair of second planet gears drivingly connecting same, the peripheries of said gears being disposed and mounted for rotation in said counterbore and piloted thereby against axial movement relative thereto, said ring gears having internal teeth with the teeth on both said ring gears being of equal number and pitch diameter, a planet carrier mounting both said first and second pairs of planet gears, and being drivingly connected to said input shaft for unitary rotation therewith, the mounting of said pair of first planet gears being at a greater radial distance than the mounting of said second pair of planet gears, said sun gears being rotatable about said input shaft, disposed adjacent to said planet carrier and drivingly connected to said output shaft, with said first sun gear being larger than said second sun gear, selectable means for maintaining a selected one of said ring gears stationary relative to said housing for selecting the desired gear ratio, said selectable means including a shifter shaft and a first and a second cam and spring operated pawls movable toward and away from said ring gears for engaging and disengaging said first and second ring gear respectively, said housing also having a projection thereon containing a radially extending bore intersecting said annular counterbore, said pawls being disposed in the bore of said projection and movable radially therein and enterable into said annular bore upon moving radially inwardly to engage said ring gears, also said shifter shaft being rotatably mounted in said housing and disposed in said radially extending bore, spring means are connected to said pawls for biasing the same radially inwardly toward said ring gear, and said shifter shaft being rotatably mounted in said housing and disposed in said radially extending bore and including a first and a second detent means spaced and indexed from each other with said detent means being cooperable with said first and second pawls respectively for allowing said spring means to bias the selected one of said pawls radially inwardly to engage a selected one of said ring gears.

13. A transmission according to claim 12 wherein said spring means includes a separate spring retainer and coil spring associated with each of said pawls, said coil spring being compressed between said spring retainer on the pawl associated therewith and said spring retainer being carried by said shifter shaft and imposing the reaction load of said coil spring on said shifter shaft.

14. A transmission according to claim 13 wherein said detent means are chordal slots formed in said shifter shaft, with said slots being axially spaced and disposed angularly in a circumferential direction with respect to each other, and said retainers are carried by said shaft at a location adjacent to said slots.

15. A transmission according to claim 13 wherein said means for securing said housing against rotation includes a boss formed on said housing and extending axially therefrom and including means for engaging the frame of the bicycle.

16. A transmission according to claim 15 including a manually operable shifter lever for moving said shifter shaft, a control cable interconnecting said shifter lever and said shifter shaft and clamping means for clamping said control cable to said boss.

* * * * *